Patented May 9, 1939

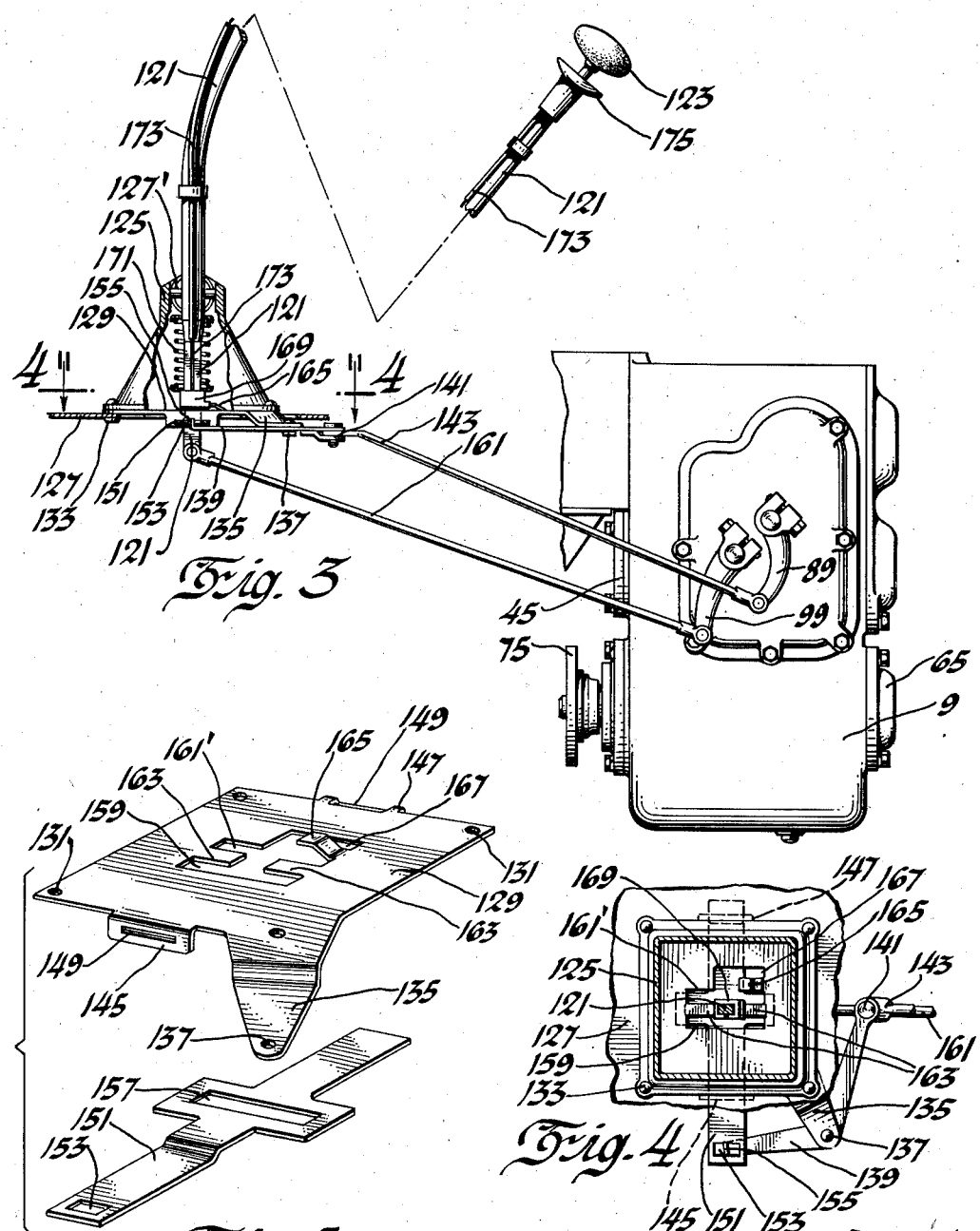

2,157,249

UNITED STATES PATENT OFFICE 2,157,249

CHANGE-SPEED CONTROL

Perry L. Tenney, Lansing, and Benton Cataline, Flint, Mich., assignors to General Motors Corporation, Detroit, Mich., a corporation of Delaware Application September 5, 1936, Serial No. 99,560

2 Claims. (Cl. 74—473)

This invention relates to change speed transmission gearing.

A primary object is to provide parallel but offset input and output shafts.

Another object is to provide a transmission wherein the gear trains themselves are so arranged as to avoid the need for gearing, in addition thereto, to accommodate a driven shaft which is necessarily out of alignment with the input shaft of the transmission.

Another object is to arrange gear trains in a way to provide four forward and two reverse driving ratios with a minimum of gear trains; with synchronism of each driving ratio by the use of only two synchromesh units; with conventional shifting and a transmission wherein remote control is easily arranged.

Another object is to produce a transmission useful where the driving axle is directly alongside or under the engine or where for any reason it is desired to have the output shaft out of alignment with the crank shaft. Such an arrangement makes it possible for the output shaft to clear the clutch and flywheel housing.

The invention may be found particularly useful for front drive installations or for driving rear wheels with rear engine mountings.

Other objects and advantages will be understood from the following description.

In the accompanying drawings, Fig. 1 is a transverse section through the novel change speed transmission.

Fig. 3 is a view in elevation showing the manually operable shift levers and connections.

Fig. 4 is a view as seen from line 4—4 of Fig. 3.

Fig. 5 is a perspective of parts shown in Fig. 3 but in disassembled relation.

Figure 1:
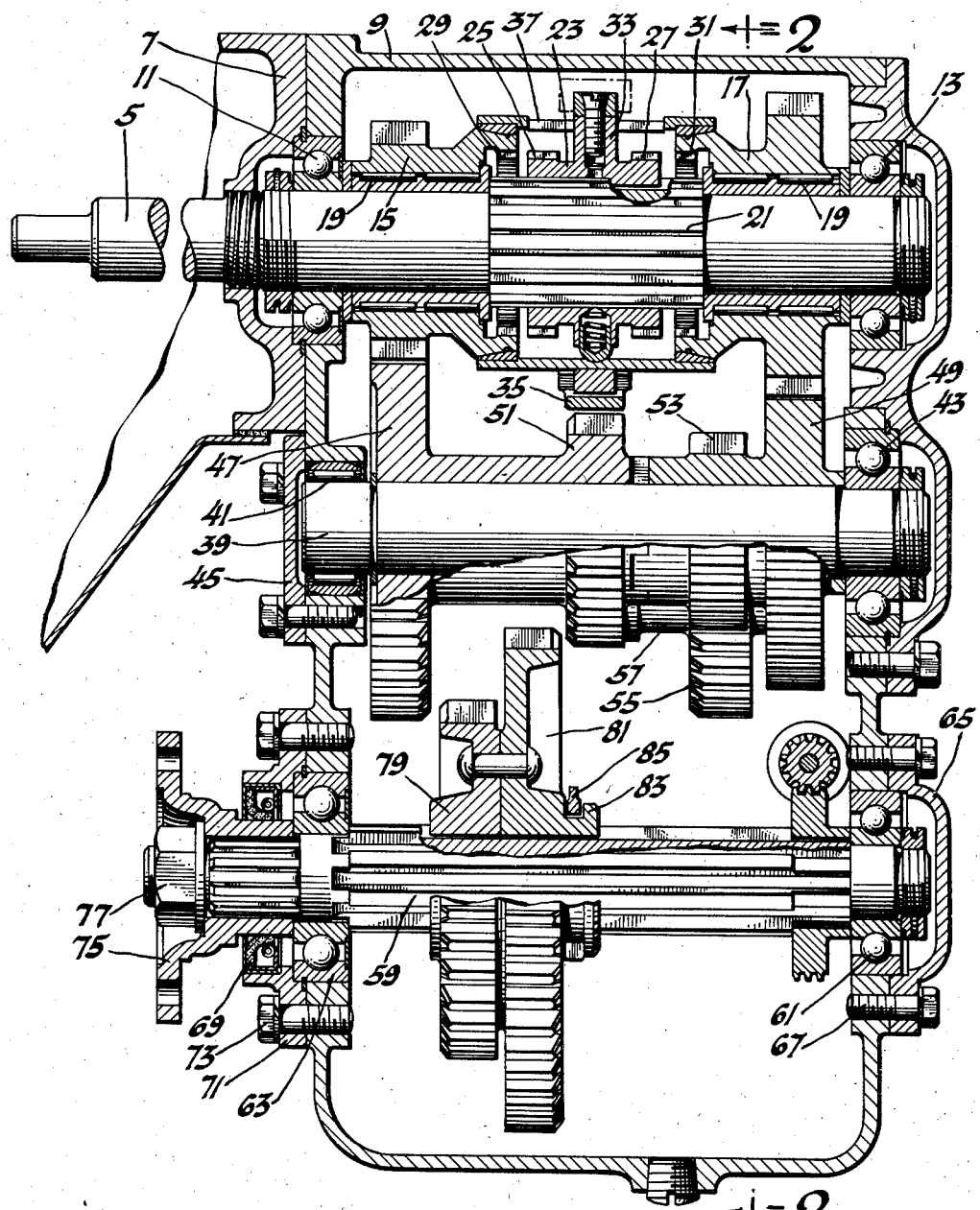
Figure 2:
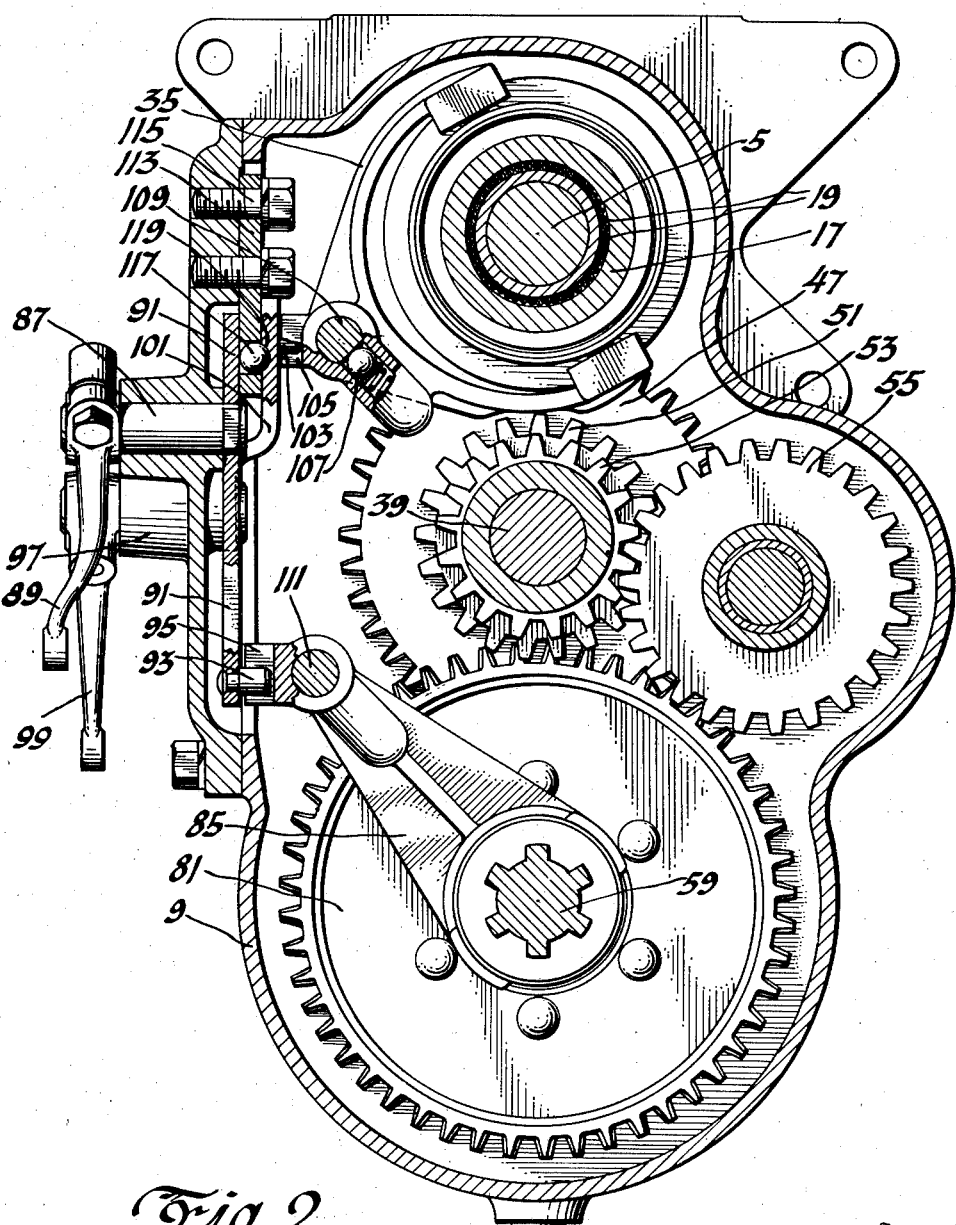
Fig. 2 is a section on line 2—2 of Fig. 1.

In the drawings, the input shaft 5 from the clutch housing 7 enters the change speed housing 9. In opposite walls the shaft 5 is supported by antifriction bearings 11 and 13. Gears 15 and 17 are rotatably supported on shaft 5 by bearings 19. Between these gears the shaft is splined at 21 for a double jaw clutch member 23 having end teeth 25 and 27 for engagement with clutch teeth 29 and 31 on gears 15 and 17, respectively. The clutch 23 may be moved to and fro by a suitable radial extension such as 33 engaged by a fork 35. This movement also moves a synchronizer 37 having conical end faces cooperating with like faces on the gears 15 and 17 adjacent the clutches 29 and 31. The structure and function of such synchronizing devices is well known and need not be more fully described. When the clutch 33 is moved to the left (Fig. 1) gear 15 is locked to shaft 5 and when moved to the right gear 15 is released and gear 17 becomes operative.

A lay shaft 39 rotates within antifriction bearings 41 and 43, the former being adjacent a removable wall cover 45. This shaft has four gears. Gear 47 meshes constantly with gear 15 as does gear 49 with gear 17. Intermediate gears 51 and 53 are shown on this shaft. Gear 55 on an idler shaft 57 is also shown.

A splined output shaft 59 is journaled on bearings 61 and 63 in the housing walls. A cover 65 covers one end of the shaft and is secured by fastening means 67. An oil seal 69 carried by a ring 71 surrounds the other end of the shaft and is secured by fastening means 73. It will be observed that a coupling member 75 is secured by fastener 77 to one end of shaft 59 and that the shaft is so far removed from shaft 5 that it will be clear of the clutch and flywheel housing 7. In some installations the shaft 59 will be arranged to extend in the opposite direction with the coupling member to the right of the housing in which case the parts 65 and 71 will be interchanged. On shaft 59 is slidably splined a double gear having two gear elements 79 and 81 equipped with a collar 83 for a fork 85. Gear 79 may be moved by its fork to mesh with gear 47 or gear 81 may be moved into engagement with gear 51. A further movement of the double gear brings 81 into mesh with idler 55.

It is intended that a transverse movement of the manually operable shift lever shall shift the double gear 79–81 to the right or left and that thereafter a longitudinal movement of the shift lever shall shift clutch 33 for engagement with either gear 15 or 17.

For moving the fork 85 there is rotatably supported in the casing wall a rock shaft 87 having an outer arm 89 and an inner arm 91, the latter carrying a crank pin 93 received within a slot 95 of the fork. A second rock shaft is rotatably supported in a casing wall boss 97. It has an outer arm 99 and an inner arm 101, the latter with a crank pin 103 engaging a slot 105 in the end of fork 35. Forks 35 and 85 have conventional locating spring detent devices 107 associated with the rails 109 and 111 on which they slide. Also, a plate 113 is secured to the casing wall at 115 and lies between arm 101 and an extension of arm 91. Plate 113 has a hole therethrough in which is a ball 117. There are pockets as at 119 in the arm and arm extension arranged opposite each other in the neutral position of the arms and forks but when one arm is rocked to determine an operative position of its fork the ball 117 is pushed partly from the hole in plate 113 and thus locks the other fork.

Figs. 3, 4 and 5 show how the ratio changes may be made by a manually operable shift lever positioned remote from the gear box. In these figures are seen the housing 9 and the arms 89 and 99. The manually operable shift lever is marked 121 and is equipped with a knob 123. A dome 125 is supported on a base 127. A shift lever fulcrum 127' of conventional design provides for both transverse movements of the lever 121 (through the plane of the paper) and longitudinal movements. A rectangular plate 129 has openings 131 for the passage of fastening means 133 by which plate 129 is secured to base 127. This plate has a corner extension 135 to which is pivoted at 137 a lever 139. One end of the lever is connected at 141 to a link 143, the link, at its other end, being pivoted to lever arm 89. The plate 129 has downturned tongues 145 and 147 which may be formed with slots such as 149 for the guidance of a sliding plate 151. The plate 151 has at one end a rectangular opening 153 to receive a lug 155 turned up from the end of lever 139. Transverse reciprocation of plate 151 rocks lever 139 and the resulting axial movement imparted to link 143 rocks lever 89 and shifts the double gear 79—81. To effect such reciprocation of plate 151, it has an elongated rectangular opening 157. The lever 121 extends through this opening and, when transversely rocked, engages one or the other of the side walls of the opening and reciprocates the plate. The long dimension of slot 157 is to accommodate longitudinal pivotal movement of lever 121. An opening in plate 129 is shaped as shown in Fig. 5. It has an elongated slot 159, a second elongated slot 161', the slots being separated by tongues 163. The lever 121 extends through the opening in plate 129 as well as through opening 157 and its lower end is connected to link 161, the latter being connected to lever arm 99. In this way longitudinal rocking of lever 121 rocks lever 99 and renders active gear train 15, 47 or gear train 17, 49. It will be seen that the opening 157 of plate 151 may be positioned to lie beneath slot 159 by a transverse rocking of the lever 121. This transverse movement has rocked the lever 139 to position gear 79 in engagement with gear 47. A longitudinal movement of the lever 121 in one direction or the other causes gear 47 to be driven at one or another of two speeds, depending upon whether gear 15 or 17 is clutched to shaft 5. The lever 121 may then be returned to its midlength position, releasing the drive of the gears on shaft 39. It may then be shifted transversely, releasing the drive of the gears on shaft 59, pass between tongues 163 and enter the slot 161'. When fully entered in slot 161', it has moved lever 139 sufficiently to engage gear 81 with gear 51, whereupon the longitudinal rocking of the lever 121 may again drive the gears of shaft 39 at either of two speeds. Thus four forward speeds are obtained.

A tongue 165 spaces slot 161' from a further slot 167. Normally the lever is prevented from being shifted transversely into slot 167 by a lug 169 slidable on the lever 121 and held by a spring 171 in position to engage the tongue 165. When the lug 169 is lifted by a tension rod 173 and hand hold 175, the slot 167 may be reached. In doing so, gear 55 may be engaged by gear 81. The slot 167 permits a longitudinal movement of the hand lever either in one direction only as shown, if but one reverse speed is desired, or in both directions if two reverse driving ratios are preferred. This latter arrangement is had by shaping slot 167 to correspond with slots 159 and 161.

By the arrangement thus shown and described the several objectives are obtained. The output shaft is positioned where it will clear the clutch housing and thus avoid the use of added gear trains in many installations when conventional gear boxes would require an additional gear to dispose the output shaft away from adjacent mechanism. By the use of eight gears only, four forward and two reverse ratios are provided with synchromesh for all ratios, this being accomplished by the use of but two synchromesh devices.

We claim:

1. For use with transmission mechanism having shiftable members to effect ratio changes, spaced parallel rockshafts extending transversely of and into said transmission mechanism, arms on said rockshafts within said transmission mechanism, connections between said arms and members whereby said arms when rocked move said shiftable members, other and external arms on said rockshafts, a manually operable shift lever, means including a link connected directly to said shift lever and to one of said rockshaft arms, a plate adapted to be reciprocated by said manually operated lever, a link connected to the second of said rockshaft arms and transmitting means between and connected to said last named link and said plate.

2. The invention defined by claim 1, together with a fixed plate having guiding means for said reciprocable plate, said guiding plate having H slot means for the passage of the manually operable lever and said reciprocable plate having a rectangular slot for the passage of the manually operable lever.

PERRY L. TENNEY.
BENTON CATALINE.